J. H. OSBORNE.
MEAT SLICER.
APPLICATION FILED NOV. 18, 1909.
1,001,768.
Patented Aug. 29, 1911.
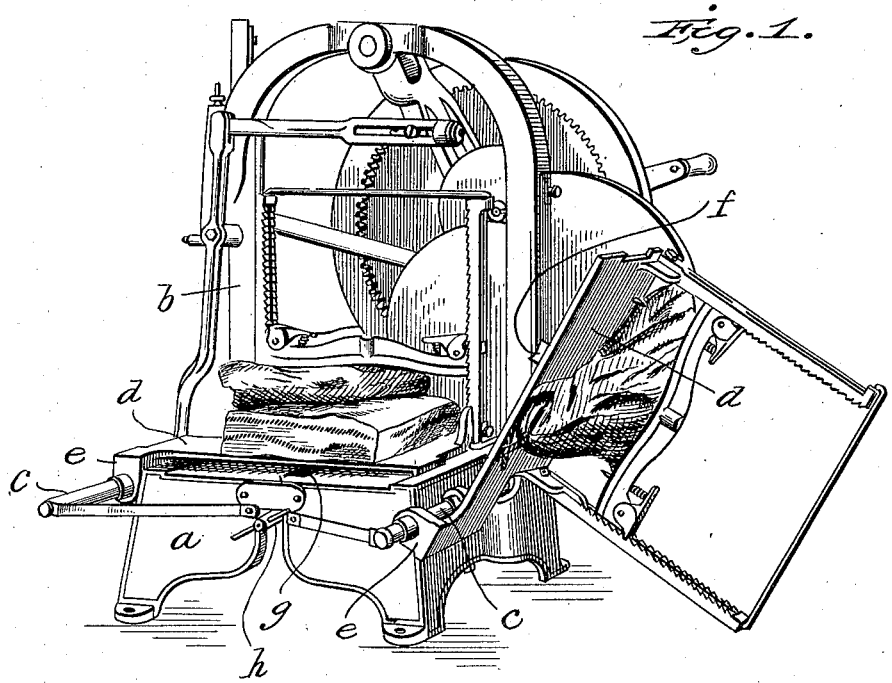
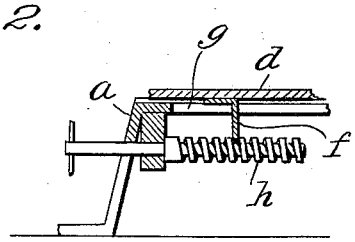
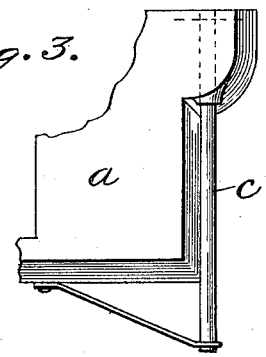
Witnesses:
Edwin L. Yewell
Inventor
John H. Osborne
By Davis & Davis
Attorneys

UNITED STATES PATENT OFFICE.

JOHN H. OSBORNE, OF ANDERSON, INDIANA.

MEAT-SLICER.

1,001,768.

Specification of Letters Patent. Patented Aug. 29, 1911.

Application filed November 18, 1909. Serial No. 528,736.

*To all whom it may concern:*

Be it known that I, JOHN H. OSBORNE, a citizen of the United States, and a resident of Anderson, in the county of Madison and State of Indiana, have invented certain new and useful Improvements in Meat-Slicers, of which the following is a full and clear specification, reference being had to the accompanying drawings, in which—
Figure 1 is a perspective view of a meat slicer provided with my invention; Fig. 2 a detail vertical section of the base showing the mechanism for feeding the table; and Fig. 3 a detail plan view of a portion of the base showing one of the supporting and guiding rods of one of the meat carriers.

This invention has special reference to that class of meat slicers in which the meat is clamped upon a carrier or table which is automatically advanced to the knife a predetermined distance after each cutting or slicing operation, and as an example of the class of machine to which my invention is specially applicable I have illustrated it in connection with the type of machine covered by the Patent No. 914,645, granted to F. P. Dunn, March 9, 1909. Heretofore machines of this type have been supplied with but a single meat carrier with the necessary result that whenever a customer called for the kind of meat that did not happen to be then clamped upon the carrier the dealer was put to the trouble of unclamping the meat then on the table and replacing it by the kind of meat called for, clamping the meat on the carrier and then readjusting the carrier up to the knife. This delay and trouble was especially serious and objectionable by reason of the fact that machines of this type are generally used only in the larger meat stores where there is considerable call for sliced meats especially during certain hours of the day.

It is the object of the present invention to provide the machine with a plurality of meat carriers so that two different kinds of meat may be carried in the machine at the same time and so arranged that either meat carrier may be quickly adjusted to the feeding and cutting position, the feeding mechanism being adapted to receive and actuate whichever meat carrier is adjusted to operative position, as more fully hereinafter set forth.

In the drawing, *a* designates the base of the machine and *b* an upright frame at the front end of the base carrying the cutting mechanism, which in the present illustration is the same as illustrated in the above named patent to Dunn. At each side of the base is rigidly mounted a horizontal rod *c*, which is parallel with the side edge of the base and is supported a little below the upper surface thereof. Slidingly and pivotally mounted on each of these rods is a meat carrier or table *d* which has at its forward end a meat clamping device of any suitable type and whose connection to the rod is by means of depending ears *e* provided with holes through which the rod freely passes. The meat carrying tables are each adapted to be swung over upon the base to cutting position, as shown at the left hand side of Fig. 1, or to be swung upwardly and outwardly to one side out of the way, as shown at the right hand side of Fig. 1.

Depending from the bottom of each meat carrier is a finger *f* which when the meat carrier is swung over upon the base into operative position extends down through a slot *g* in the base into engagement with the feed screw *h*, which may be operated by hand or automatically in the usual or any improved manner.

In this arrangement it will be observed that two kinds of meat can be carried in the machine at one time and in such relation to each other and the feeding and cutting means that either kind of meat can be quickly brought to the cutter without disturbing the other kind of meat any more than to simply swing its carrier to one side where it will remain until that kind of meat is again called for.

It will be observed that a feature of importance lies in the fact that with my arrangement of meat carriers a single feeding mechanism may be used for both carriers.

Having thus fully described my invention, what I claim as new, and desire to secure by Letters Patent, is—

1. In combination with a base and a meat slicing mechanism thereon, of a single central feed means, and a pair of meat carriers each being provided with means for separately engaging with said feed means whereby either but not both the carriers may operate at one time, said meat carriers being movably connected with the base at opposite sides thereof, for the purpose set forth.

2. In combination with a meat slicing machine embodying a base, cutting means, a single central feed means, of a pair of meat carriers each being provided with means for engagement with the feed means, said meat carriers being pivotally and slidingly mounted at opposite sides of the base whereby they are adapted to be alternately swung over upon the base into feeding and cutting position.

3. In combination with a meat slicing machine embodying a slotted base, slicing means, a single central feed screw arranged below the slot in the base, a rod mounted at each side of the base below the top surface thereof, and a meat carrier slidingly and pivotally mounted on each of said rods and each being provided with a finger adapted to pass through the aforesaid slot and engage the feed screw, for the purpose set forth.

In testimony whereof I hereunto affix my signature in the presence of two witnesses this 11th day of November 1909.

JOHN H. OSBORNE.

Witnesses:
G. A. LAMBERT,
GLAD. S. KING.

---

Copies of this patent may be obtained for five cents each, by addressing the "Commissioner of Patents, Washington, D. C."